(12) United States Patent
Cook et al.

(10) Patent No.: US 7,448,341 B2
(45) Date of Patent: Nov. 11, 2008

(54) GAUGE LASER POINTER

(75) Inventors: David Cook, Plymouth, MI (US); Steve Tononi, Clinton Township, MI (US); Jagadeesh Krishnamurthy, Troy, MI (US); Christopher Arms, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 11/636,790

(22) Filed: Dec. 11, 2006

(65) Prior Publication Data

US 2008/0134956 A1  Jun. 12, 2008

(51) Int. Cl.
G01D 11/28 (2006.01)
G12B 11/04 (2006.01)

(52) U.S. Cl. ............... 116/286; 116/62.1; 116/DIG. 5; 362/23

(58) Field of Classification Search ............... 116/62.1, 116/62.4, 286, 287, 288, DIG. 5, DIG. 6, 116/DIG. 36; 362/23, 28, 29, 30
See application file for complete search history.

(56) References Cited

U.S. PATENT DOCUMENTS

| | | | |
|---|---|---|---|
| 4,761,715 A * | 8/1988 | Brooks | 362/23 |
| 5,353,735 A * | 10/1994 | Arai et al. | 116/286 |
| 6,206,533 B1 | 3/2001 | Shi | |
| 6,379,015 B2 * | 4/2002 | Wilhelm et al. | 362/23 |
| 6,456,260 B1 | 9/2002 | Koenig et al. | |
| 6,663,251 B2 | 12/2003 | Calvert | |
| 6,915,758 B2 * | 7/2005 | Nakagawa et al. | 116/286 |
| 6,980,729 B2 | 12/2005 | Shi | |
| 2005/0146885 A1 * | 7/2005 | Sumiyoshi | 362/488 |
| 2007/0157745 A1 * | 7/2007 | Takato et al. | 73/866.3 |
| 2008/0173233 A1 * | 7/2008 | Liu | 116/286 |

FOREIGN PATENT DOCUMENTS

| | | | |
|---|---|---|---|
| JP | 02266227 A | * | 10/1990 |
| JP | 03012516 A | * | 1/1991 |
| JP | 03025318 A | * | 2/1991 |
| JP | 05026698 A | * | 2/1993 |
| JP | 07280600 A | * | 10/1995 |
| JP | 08193852 A | * | 7/1996 |
| JP | 08193853 A | * | 7/1996 |
| JP | 2002162259 A | * | 6/2002 |
| JP | 2003215142 A | * | 7/2003 |
| JP | 2005181017 A | * | 7/2005 |
| JP | 2005274438 A | * | 10/2005 |
| JP | 2007304067 A | * | 11/2007 |

* cited by examiner

Primary Examiner—R. A. Smith
(74) Attorney, Agent, or Firm—Harness, Dickey & Pierce, PLC

(57) ABSTRACT

A gauge has a face plate which includes indicia thereon to indicate specific values of a parameter. A laser system is disposed behind and/or in front of the face plate to project a beam onto the face plate to indicate the value of a parameter. A stepper motor moves the beam based upon the output of a sensor which monitors the parameter.

3 Claims, 3 Drawing Sheets

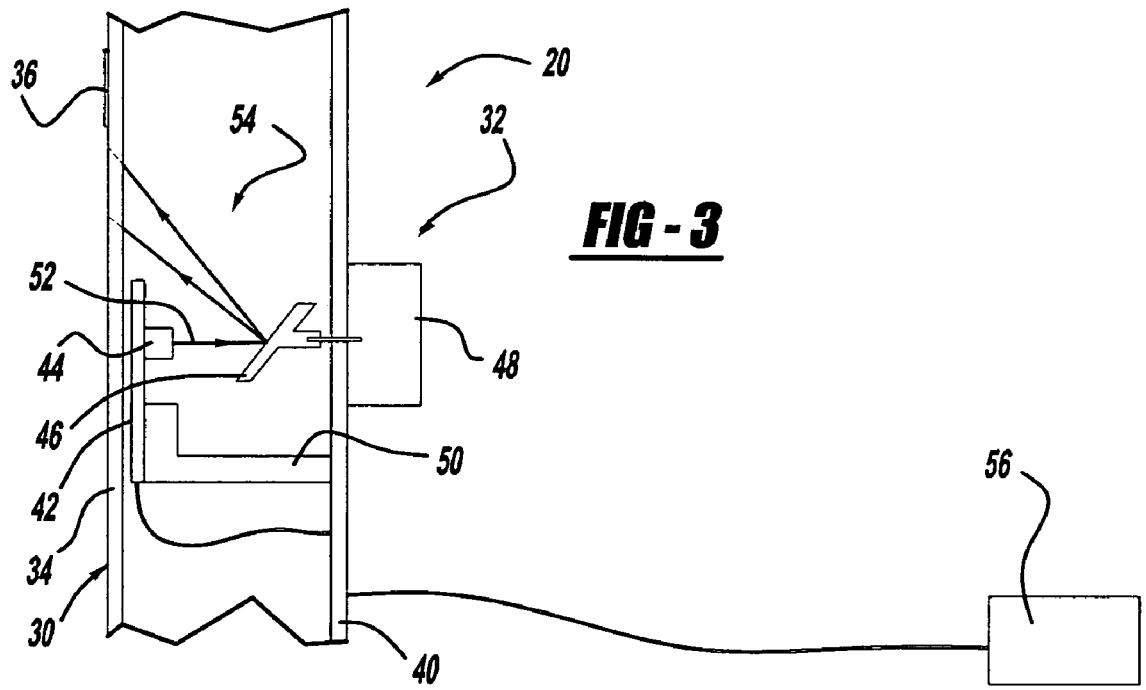
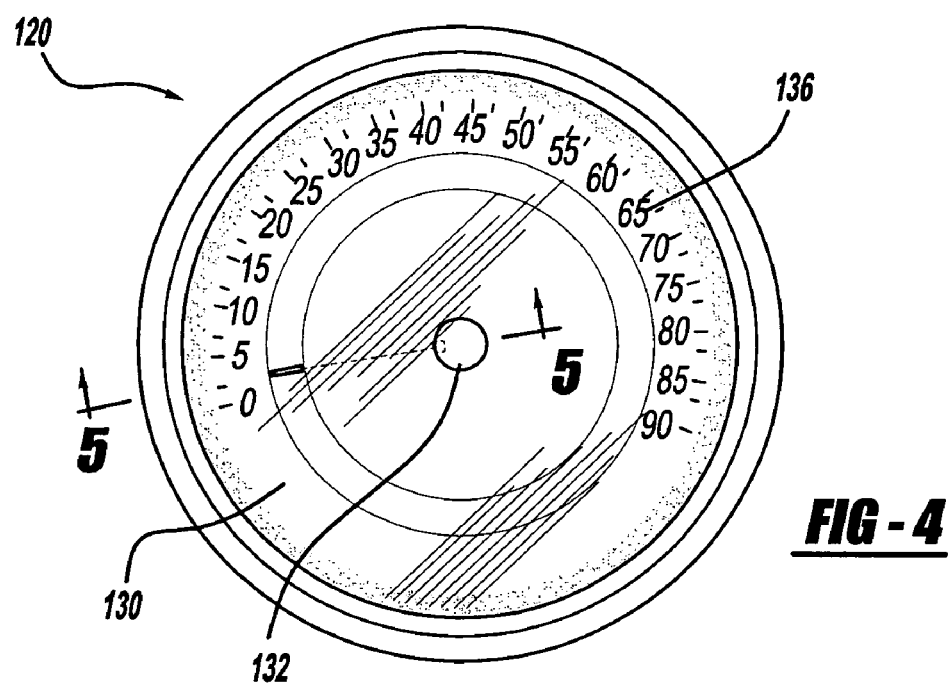

7,448,341 B2

GAUGE LASER POINTER

FIELD

The present disclosure relates to gauges such as instrument panel gauges for an automobile. More particularly, the present disclosure relates to gauges which have a laser pointer which indicates the value being displayed by the gauge.

BACKGROUND

The statements in this section merely provide background information related to the present disclosure and may not constitute prior art.

Gauges are utilized throughout industry to display a value of a parameter being monitored by the gauge. In the automotive industry, a plurality of gauges are located on the instrument panel or dashboard for displaying information relating to the operating conditions of the vehicle. These gauges include, but are not limited to, speedometers, tachometers, engine coolant temperature, engine oil temperature, fuel level, oil pressure, battery voltage and the like. The gauges can include an analog and/or digital readout for displaying the valve of the monitored parameter depending upon the design of the specific gauge. An analog gauge typically includes a face plate of some type having indicia thereon such as numbers, letters or indicators. A pointer rotates or traverses across the face plate and is positioned or stops on the face plate at the point which indicates the value of the parameter being monitored.

SUMMARY

A gauge includes a face plate having indicia thereon to indicate specific values of a parameter. A laser system is disposed behind or in front of the face plate. The laser system projects a beam onto the face plate to indicate the value of the monitored parameter. The laser system includes a driving device which receives an input from the monitored parameter and based upon this input the driving device moves the beam into the proper position for indicating the specific value of the parameter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a schematic side view of the speedometer illustrated in FIG. 2;

FIG. 4 is a front view of a speedometer according to another embodiment of the present invention.

DETAILED DESCRIPTION

The following description is merely exemplary in nature and is not intended to limit the present disclosure, application, or uses.

Figure 1:
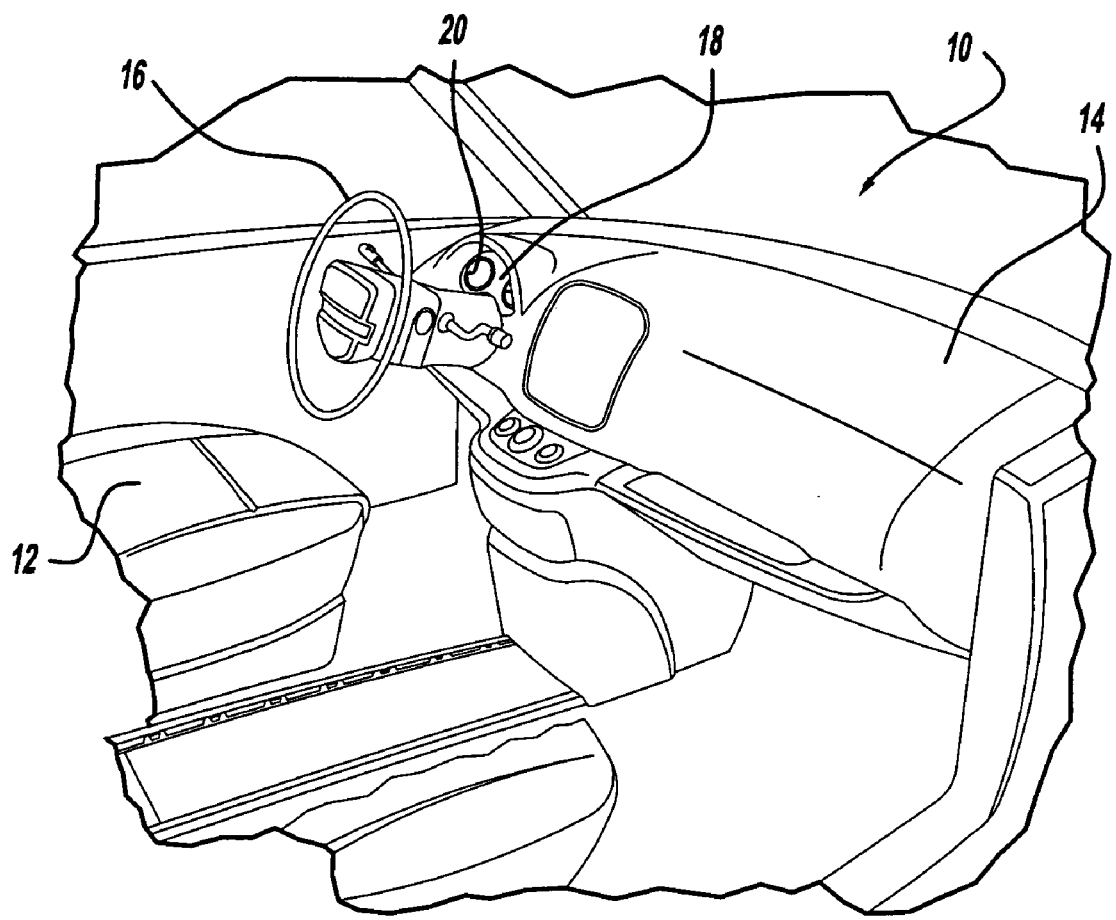
FIG. 1 is a perspective view of an instrument cluster of a typical automotive vehicle.

FIG. 1 illustrates a typical interior 10 for an automotive vehicle. The interior includes vehicle seating 12, a dashboard 14, a steering wheel 16 and an instrument cluster 18. While FIG. 1 illustrates a left-hand drive vehicle, the present disclosure also applies to right-hand drive vehicles.

Instrument cluster 18 includes a plurality of gauges typically including a gauge 20 which is illustrated as a speedometer. While the present disclosure is being described using speedometer 20 as the gauge, it is to be understood that any other gauge including, but not limited to, tachometers, engine coolant temperature, engine oil temperature, fuel level, oil pressure, battery voltage and the like can also incorporate the features described for speedometer 20.

Figure 2:
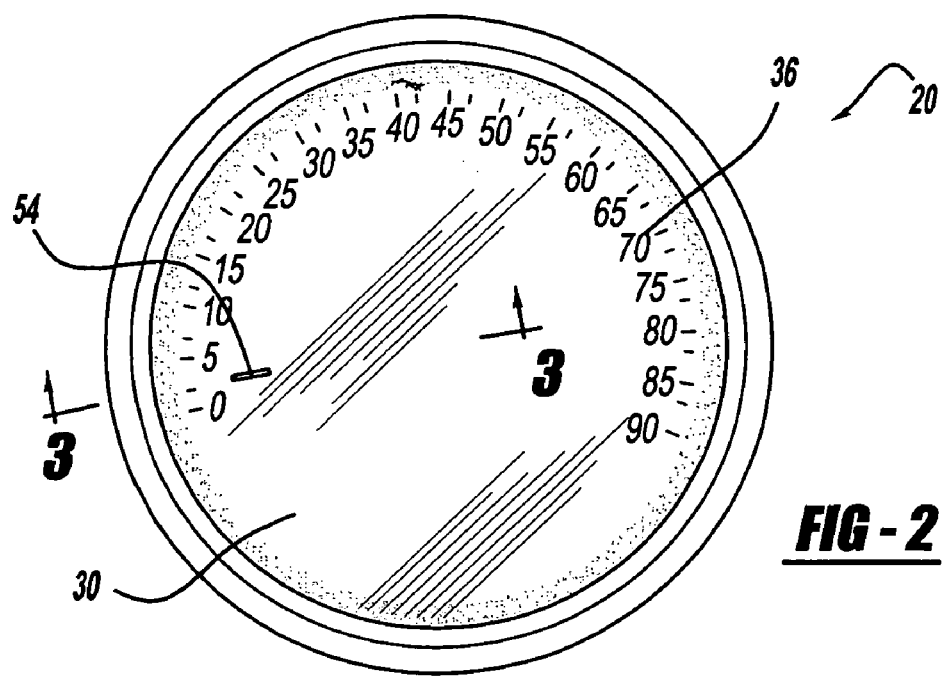
FIG. 2 is a front view of the speedometer which is located on the instrument cluster illustrated in FIG. 1.

Referring now to FIGS. 2 and 3, speedometer 20 is illustrated in greater detail. Speedometer 20 comprises a face plate 30 and a laser indicating system 32. Face plate 30 includes a base plate 34 and a plurality of indicators or indicia 36. Base plate 34 is a circular disc having the plurality of indicators 36 located along an outer circumferential portion of base plate 34. While base plate 34 is illustrated as a circular disc, it is within the scope of the present disclosure to have other shapes for base plate 34 including, but not limited to oval and rectangular.

The plurality of indicators 36 are arranged in ascending order to indicate the speed of the vehicle. The plurality of indicators 36 can represent miles per hour, kilometers per hour or both. While the plurality of indicators 36 are illustrated as indicating the speed of the vehicle, the plurality of indicators 36 can indicate any set of values monitored by gauge 20.

Laser indicating system 32 comprises a first printed circuit board 40, a second printed circuit board 42, a laser diode 44, a rotating reflector 46 and a stepper motor 48. First printed circuit board 40 is mounted behind face plate 30. Second printed circuit board 42 is mounted between first printed circuit board 40 and face plate 30. A connector 50 mechanically connects second circuit board 42 to first circuit board 40. Connector 50 can also provide the electrical connection between second circuit board 42 and first circuit board 40 or a separate electrical connection can be made.

Laser diode 44 emits a beam 52 from second circuit board 42 towards first circuit board 40. Rotating reflector 46 is mounted to stepper motor 48 which is mounted to first circuit board 40. Beam 52 emitted by laser diode 44 is reflected and shaped by rotating reflector 46 so that a generally linear or plate 30 allows transmission of beam 54 from rotating reflector 46 through base plate 34 at a position radially inward and/or at the same radial position of the plurality of indicators 36. Stepper motor 48 electrically communicates with a sensor 56 which transmits an electrical signal indicating the speed of the vehicle. Stepper motor 48 rotates rotating reflector 46 which, in turn, moves reflected beam 54 circumferentially around face plate 30 in order to place reflected beam 54 adjacent the specific indicator 36 for indicating the current speed of the vehicle. While reflected beam 54 is being described as a linear or rectangular beam, it is within the scope of the present invention to have reflected beam 54 be any shape which can indicate the speed of the vehicle.

Figure 5:
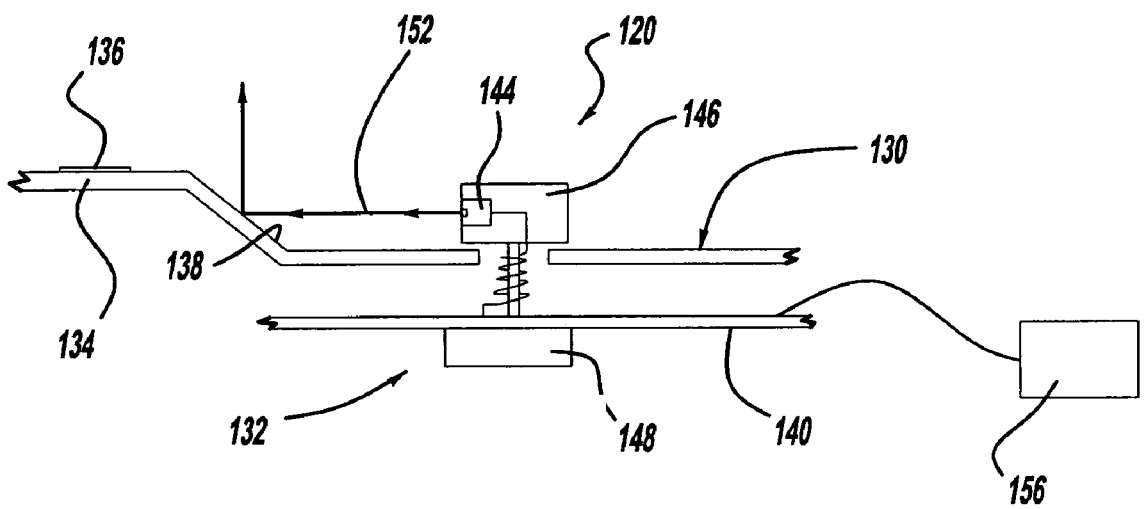
FIG. 5 is a schematic side view of the speedometer illustrated in FIG. 4.

Referring now to FIGS. 4 and 5, a gauge in the form of a speedometer 120 is illustrated. Speedometer 120 is a direct replacement for speedometer 20 in instrument cluster 18. Speedometer 120 comprises a face plate 130 and a laser indicating system 132.

Face plate 130 includes a base plate 134 and a plurality of indicators or indicia 136. Base plate 134 is a circular disk having the plurality of indicators 136 located along an outer circumferential portion of base plate 134. While base plate 134 is illustrated as a circular disk, it is within the scope of the present disclosure to have other shapes for base plate 134 including but not limited to oval and rectangular.

The plurality of indicators 136 are arranged in ascending order to indicate the speed of the vehicle. The plurality of indicators 136 can represent miles per hour, kilometers per hour or both. While the plurality of indicators 136 miles per hour, kilometers per hour or both. While the plurality of indicators 136 are illustrated as indicating the speed of the vehicle, the plurality of indicators 136 can indicate any set of values monitored by gauge 120. Base plate 134 includes a step which defines an angular surface 138. Angular surface 138 is designed to reflect the laser beam to indicate the speed of the vehicle as discussed below. The material for base plate 134 can be designed to reflect the laser beam, angular surface 138 can be painted or printed to reflect the laser beam or angular surface 138 can be provided with an appliqué for reflection of the laser beam.

Laser indicating system 132 comprises a printed circuit board 140, a laser diode 144, a rotating hub 146 and a stepped motor 148. Printed circuit board 140 is mounted behind face plate 130. Laser diode 144 emits a beam 152 which is directed toward angular surface 138. Laser diode 144 is disposed within rotating hub 146 which is mounted to stepped motor 148 which is mounted to circuit board 140. Rotating hub 146 is mounted above face plate 130 with stepped motor 148 being mounted behind face plate 130 to circuit board 140.

Beam 152 emitted by laser diode 144 is directed towards angular surface 138 and is reflected toward the driver by angular surface 138. Beam 152 can be a generally linear or rectangular beam or beam 152 can be any shape which can indicate the speed of the vehicle. Beam 152 is directed towards angular surface 138 and angular surface 138 is disposed radially inward from the plurality of indicators 136 or the plurality of indicators 136 can be located on angular surface 138. Stepped motor 148 electrically communicates with a vehicle. Stepped motor 148 rotates rotating hub 146 which moves beam 152 circumferentially around face plate 130 in order to place beam 152 adjacent the specific indicator 136 for indicating the current speed of the vehicle.

What is claimed is:

1. A gauge comprising:
a face plate;
a plurality of indicators disposed on a front side of the face plate;
a stationary laser diode, pointed away from the face plate, for projecting a beam onto the face plate;
a sensor disposed to monitor a parameter and output a signal indicating a value of the parameter;
a drive system, disposed behind a rear side of the face plate, for rotating the beam from the laser to a position adjacent a specific one of the plurality of indicators based on the signal output from the sensor, the drive system including a rotating reflector rotatably attached to a stepper motor, the rotating reflector for receiving the beam perpendicular to the face plate and projecting the beam at a non-perpendicular angle to the face plate, wherein the drive system is mounted to a first circuit board and the stationary laser diode is mounted to a second circuit board; and
a connector mechanically and electrically connecting the second circuit board to the first circuit board.

2. A gauge comprising:
a face plate;
a plurality of indicators disposed on a front side of the face plate;
a stationary laser diode, pointed away from the face plate, for projecting a beam onto the face plate;
a sensor disposed to monitor a parameter and output a signal indicating a value of the parameter; and
a drive system, which includes a rotating reflector rotatably attached to a stepper motor, for rotating the beam from the laser to a position adjacent a specific one of the plurality of indicators based on the signal output from the sensor, wherein the drive system is mounted to a first circuit board and the stationary laser diode is mounted to a second circuit board; and
a connector mechanically and electrically connecting the second circuit board to the first circuit board.

3. A gauge comprising:
a face plate;
a plurality of indicators disposed on a front side of the face plate;
a stationary laser diode, pointed perpendicularly away from the face plate, for projecting a beam onto the face plate;
a sensor disposed to monitor a parameter and output a signal indicating a value of the parameter; and
a drive system, mounted to a first circuit board disposed behind a rear side of the face plate, for rotating the beam from the laser to a position adjacent a specific one of the plurality of indicators based on the signal output from the sensor, wherein the drive system includes a rotating reflector rotatably attached to a stepper motor and the laser is located between the face plate and the rotating reflector, wherein the stationary laser diode is mounted to a second circuit board and the gauge; and
a connector mechanically and electrically connecting the second circuit board to the first circuit board.

* * * * *